(12) United States Patent
Son et al.

(10) Patent No.: US 9,549,119 B2
(45) Date of Patent: *Jan. 17, 2017

(54) APPARATUS AND METHOD FOR CONTINUOUSLY TAKING A PICTURE

(71) Applicant: Samsung Electronics Co., Ltd., Gyeonggi-do (KR)

(72) Inventors: Joo-Young Son, Gyeonggi-do (KR); Tae-Hwa Hong, Seoul (KR); Hong-Il Kim, Gyeonggi-do (KR); Woon-Tahk Sung, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,235

(22) Filed: Oct. 5, 2015

(65) Prior Publication Data

US 2016/0028946 A1 Jan. 28, 2016

Related U.S. Application Data

(63) Continuation of application No. 13/860,215, filed on Apr. 10, 2013, now Pat. No. 9,154,692.

(30) Foreign Application Priority Data

Apr. 10, 2012 (KR) .................. 10-2012-0037302

(51) Int. Cl.
*H04N 5/232* (2006.01)
*H04N 5/235* (2006.01)
*G06K 9/00* (2006.01)
*H04N 1/00* (2006.01)

(52) U.S. Cl.
CPC ........ *H04N 5/23222* (2013.01); *H04N 5/2356* (2013.01); *H04N 5/23206* (2013.01); *H04N 5/23216* (2013.01); *H04N 5/23219* (2013.01); *G06K 9/00302* (2013.01); *H04N 1/00183* (2013.01); *H04N 5/23293* (2013.01)

(58) Field of Classification Search
CPC ............ H04N 1/00183; H04N 5/23219; H04N 5/23222; H04N 5/23293; H04N 5/2356
See application file for complete search history.

(56) References Cited

U.S. PATENT DOCUMENTS

| 7,362,354 | B2 | 4/2008 | Lin |
| 7,924,326 | B2 | 4/2011 | Kojima |
| 8,081,227 | B1 | 12/2011 | Kim et al. |
| 8,125,557 | B2 | 2/2012 | Chen et al. |
| 8,199,208 | B2 | 6/2012 | Katsumata et al. |

(Continued)

FOREIGN PATENT DOCUMENTS

JP 2007-088594 4/2007

*Primary Examiner* — Daniel M Pasiewicz
(74) *Attorney, Agent, or Firm* — The Farrell Law Firm, P.C.

(57) ABSTRACT

An electronic device is disclosed. The electronic device includes an image capturing unit configured to obtain a plurality of images upon receiving one or more user inputs, a processor configured to process one or more of the plurality of images, and a display configured to display the one or more of the plurality of images, where the processor is further configured to select at least one image from the plurality of images, based on a facial expression of one or more objects recognized on the one or more of the plurality of images and a clarity of at least a portion of the one or more of the plurality of images.

21 Claims, 10 Drawing Sheets

(56) References Cited

U.S. PATENT DOCUMENTS

| | | |
|---|---|---|
| 8,830,341 B2 | 9/2014 | Pore |
| 9,154,692 B2 * | 10/2015 | Son .................... H04N 5/23222 |
| 2006/0061678 A1 | 3/2006 | Yamazaki |
| 2006/0221223 A1 | 10/2006 | Terada |
| 2007/0019943 A1 | 1/2007 | Sueyoshi et al. |
| 2007/0076960 A1 | 4/2007 | Takamori et al. |
| 2008/0043108 A1 | 2/2008 | Jung et al. |
| 2009/0046900 A1 | 2/2009 | Ogawa |
| 2012/0013783 A1 | 1/2012 | Asami |

* cited by examiner

APPARATUS AND METHOD FOR CONTINUOUSLY TAKING A PICTURE

PRIORITY

This application is a continuation of the U.S. patent application Ser. No. 13/860,215 which was filed in the United States Patent and Trademark Office on Apr. 10, 2013 and which claims priority under 35 U.S.C. §119(a) to Korean Patent Application Serial No. 10-2012-0037302, which was filed in the Korean Intellectual Property Office on Apr. 10, 2012, the entire content of which is incorporated herein by reference.

BACKGROUND

1. Field of the Invention

The present invention generally relates to an electronic device, and more particularly, to an electronic device for taking a picture.

2. Description of the Related Art

With the availability of a wide variety of digital cameras, recently, a camera has been recognized by people as an electronic device for general use. To the extent that different mobile devices (i.e., a digital camera, a portable phone, or a smart phone) have at least a built-in camera, frequency of use of the mobile device camera by people has progressively increased.

Accordingly, it is essentially realized that contemporary mobile devices are capable of carrying out video communication and data communication as well as voice communication. It is, especially, realized that the mobile devices employ at least a digital camera module so as to perform a function of a digital camera.

The digital camera module employed in the mobile device only has basic functions necessary for photographing, storing and transmitting. In order to satisfy different requirements of users, however, technological developments for improving a quality and functions of the mobile devices continue.

Recently, the mobile devices have been improved so that they possess the performance capabilities, quality and functions equal to or more effective than those of general digital cameras. Particularly, the mobile devices have various functions for editing photographed images as well as setting photographing states and photographing environments, so as to satisfy the requirements of the user.

SUMMARY

Accordingly, an aspect of the present invention is to provide an electronic device and method of operating an electronic device, in which it is possible to evaluate a plurality of pictures continuously taken by using various evaluation elements such as a clarity and blinking of eyes, as well as a face detection method and a smile detection method, thereby recommending a picture with a high quality to a user.

Also, another aspect of the present invention is to provide an electronic device and method of operating an electronic device, in which a plurality of pictures taken through a continuous-shooting function is evaluated by using a face region evaluation score or a clarity evaluation score. An evaluation of pictures may be performed even if a subject is not a person, thereby recommending a picture with a high quality to a user.

In accordance with an aspect of the present invention, an electronic device is provided. The electronic device includes an image capturing unit configured to obtain a plurality of images upon receiving one or more user inputs, a processor configured to process one or more of the plurality of images, and a display configured to display the one or more of the plurality of images, where the processor is further configured to select at least one image from the plurality of images, based on a facial expression of one or more objects recognized on the one or more of the plurality of images and a clarity of at least a portion of the one or more of the plurality of images.

In accordance with another aspect of the present invention, a method of operating an electronic device is provided. The method includes obtaining a plurality of images upon receiving one or more user inputs, selecting at least one image from the plurality of images, based on a facial expression of one or more objects recognized on the one or more of the plurality of images and a clarity of at least a portion of the one or more of the plurality of images.

In accordance with another aspect of the present invention, an apparatus is provided. The apparatus includes a camera unit configured to obtain a plurality of images upon receiving one or more user inputs, and a processor configured to process one or more of the plurality of images, where the processor is further configured to select at least one image from the plurality of images, based at least partly on at least one of an image quality of one or more human faces recognized on one or more of the plurality of images, and a clarity of at least a portion of one or more of the plurality of images.

Also, according to the embodiment of the present invention, a plurality of pictures taken through a continuous-shooting is evaluated by using a face region evaluation score or a clarity evaluation score. An evaluation of pictures can be performed even if a subject is not a person, thereby recommending a picture with a high quality to a user.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
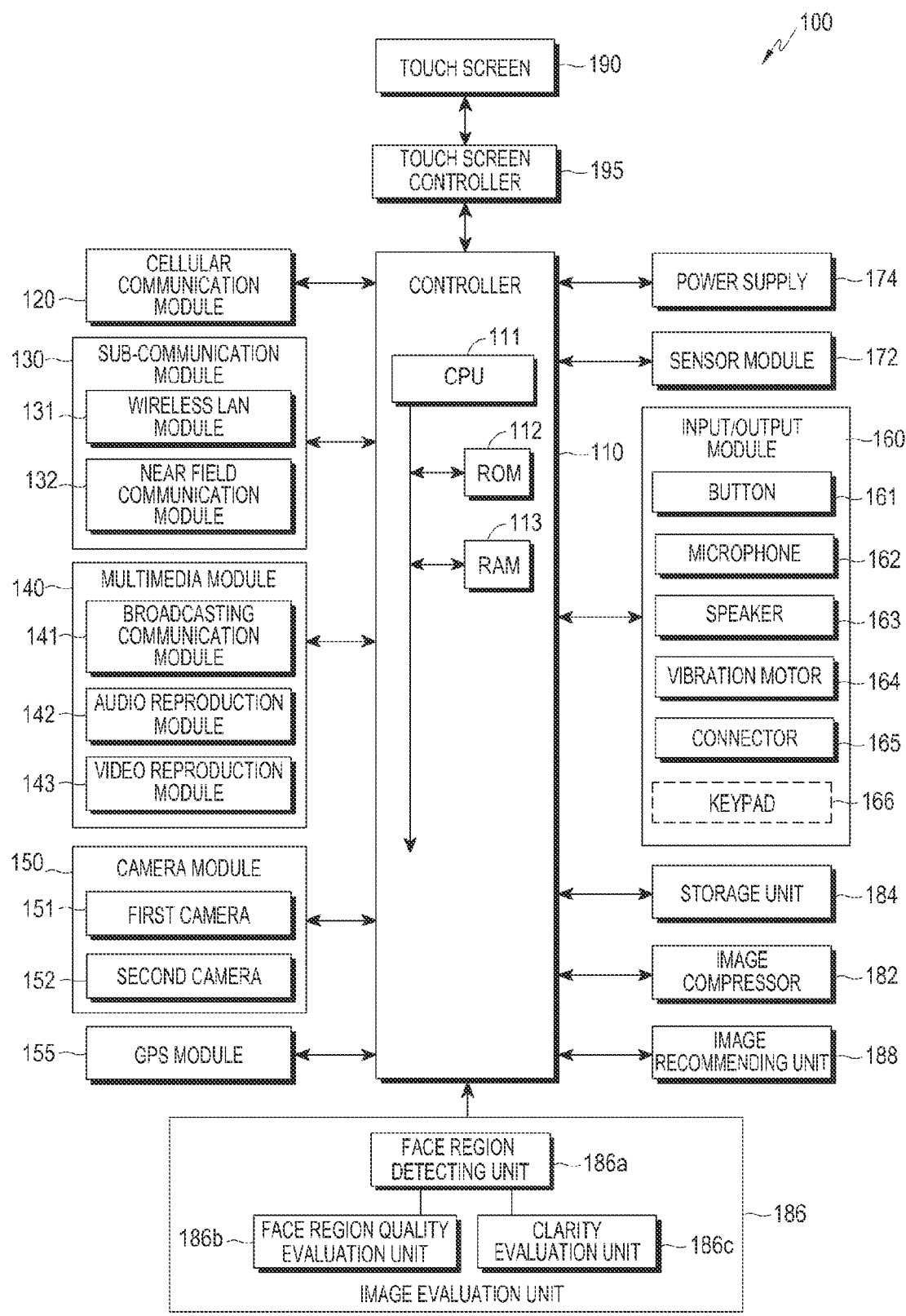
FIG. 1 is a block diagram illustrating a structure of a mobile device according to an embodiment of the present invention.

Hereinafter, embodiments of the present invention will be described with reference to the accompanying drawings. In the following description, a detailed description of known functions and configurations incorporated herein will be omitted when it may obscure the subject matter of the present invention. Further, various specific definitions found in the following description are provided only to help a general understanding of the present invention, and it is apparent to those skilled in the art that the present invention can be implemented without such definitions. Therefore, the definitions thereof should be interpreted in light of the entire description of the present invention.

Certain mobile devices have a continuous photographing function (i.e., continuous-shooting function) for continuously taking a plurality of images with a shutter-release operation, as one of various digital camera functions adopted thereto.

For example, the continuous-shooting function automatically and continuously photographs a predetermined number of stationary images at a predetermined time interval when a user actuates a shutter-release button of a camera in a state of setting a burst mode. Further, the continuous-shooting may be a function of the camera of automatically and continuously photographing stationary images at a predetermined time interval while the shutter-release button is pressed in the state of setting the burst mode.

Such a continuous-shooting function can be used for continuously taking pictures of a certain subject as well as for taking pictures of a continuously moving subject such as, for example, a) photographing a baby or a pet, the movement of which cannot be controlled, b) taking a picture of a subject in a unstable posture, c) photographing a portrait, and d) taking a plurality of pictures due to unexpected movement or unstable posture, thereby selecting the best picture desired from pictures.

According to the continuous-shooting function described above, the mobile device is only capable of continuously taking and displaying a picture. Accordingly, the mobile device lacks the ability to evaluate a quality of pictures based on whether any one of the continuously taken pictures is an excellent picture, or whether any of the pictures are satisfactory to the user.

Where the user wants to select an excellent one or a desired one of the plurality of pictures taken continuously, there is an inconvenience in that the user must personally compare and evaluate the plurality of pictures with one another so as to select satisfactory pictures as a result of evaluation.

Even though the user personally compares the plurality of pictures taken continuously, it is difficult for the user to compare the pictures because the mobile devices have small display screens. As such, there is an inconvenience in that it is difficult to select desired pictures or excellent pictures because although it may be easy to compare well marked-distinctive features of pictures on the small-sized display, it is difficult to compare fine features of pictures such as definition.

On the other hand, in certain embodiments, a method is provided for recommending one of the plurality of pictures, which satisfies predetermined conditions using a face detection technique and a smile detection technique. However, since the pictures are evaluated using a single evaluation element such as a face detection condition or a smile detection condition, there is a problem in that the evaluation is restricted. Also, since an image quality of an entire region or a detailed region of the picture is not evaluated, there is a problem in that a picture having a low image quality is recommended. Furthermore, the picture evaluation method using the face detection technique or the smile detection technique can only be used when taking a picture of a human. Therefore, there is a need for providing a picture evaluation method that can be adapted to a non-human object.

The various embodiments of the present invention can provide a method for generating one or more images. The method can include taking or shooting pictures continuously, and evaluating one or more of the pictures according to a demand of a user; and recommending one or more images, based at least partly on the evaluation. In this description, the phrases "taking pictures continuously" and "shooting pictures continuously" generally refer to taking multiple pictures at an interval upon receiving one or more user commands or inputs (for example, clicking a virtual button or pressing a physical button).

According to the embodiments of the present invention, face regions are respectively detected from the continuously taken pictures, and then cases in which a detection of a face region are distinguished from cases in which no face region is detected, so as to evaluate each image.

For example, when a face region is detected, a quality of the face region is evaluated by using one or more of a red eye, closed eye, facial expression, facial pose, or eye line. Also, the clarity of an entire image can be evaluated by adding a weight to a desired region including the face region according to a predetermined criterion. As a result, it is possible to recommend to the user an image having higher evaluation values of the face region quality and clarity than those of others. On the other hand, when a face region is not detected, the clarity of the entire region in each of the images is evaluated, so as to recommend to the user an image having a higher evaluation value of the clarity than that of others.

According to the embodiments of the present invention, it is possible to evaluate the pictures taken through the continuous-shooting by using different evaluation elements such as one or more of a red eye, closed eye, facial expression, facial pose, or eye line and clarity in the face region, so as to recommend to the user an image having a high quality. On the other hand, according to the embodiment of the present invention, even when the face region is not detected from images, it is possible to carry out the evaluation for the images, thereby recommending to the user an image having a high quality.

The apparatus and method for taking pictures continuously according to the embodiments of the present invention can be employed in mobile devices having a camera module or a camera function. The mobile devices include portable and mobile communication terminals such as, for example, a portable phone, a smart phone, a camera phone, and the like. Any kind of electronic devices that a user carries and has a camera function may employ the apparatus and method according to the present invention. In following description, the present invention is described with regards to a mobile device capable having a camera function and capable of taking pictures continuously. However, those of skill in the art will understand that the description of the present invention with regards to the mobile device is given by way of example and that the present invention may be utilized in any electronic device.

FIG. 1 is a block diagram illustrating the structure of a mobile device 100 according to an embodiment of the present invention. Referring to FIG. 1, the mobile device 100 is connected to an external device (not shown) using a mobile communication module 120, a sub-communication module 130, and a connector 165. The external device may include, for example, a portable phone (not shown), a smart phone (not shown), a tablet PC (not shown), a server (not shown), and another device (not shown).

The mobile device 100 includes a touch screen 190 and a touch screen controller 195. Also, the mobile device 100 includes a controller 110, the mobile communication module 120, the sub-communication module 130, a multimedia module 140, a camera module 150, a GPS module 155, an input/output module 160, a sensor module 172, a power supply 174, a storage unit 182, an image compressor 184, an image estimating unit 186 and an image recommending unit 188. The sub-communication module 130 includes at least one of a wireless LAN module 131 and a near field communication module 132. The multimedia module 140 has at least one of a broadcasting communication module 141, an audio reproduction module 142, and a video reproduction module 143. The camera module 150 includes at least one of a first camera 151 and a second camera 152. The input/output module 160 includes at least one of a button 161, a microphone 162, a speaker 163, a vibration motor 164, a connector 165, and a keypad 166.

The controller 110 includes a CPU 111, a ROM 112 for storing a control program for controlling the mobile device 100, and a RAM 113 for storing signals or data inputted from the outside to the mobile device 100 and/or used as a storage region to save an operation carried out in the mobile device 100. The CPU 111 may have a single core, dual cores, triple cores, or quad cores. The CPU 111, the ROM 112 and the RAM 113 are connected to each other by means of an internal bus.

The controller 110 controls the mobile communication module 120, the sub-communication module 130, the multimedia module 140, the camera module 150, the GPS module 156, the input/output module 160, the sensor module 172, the power supply 174, the image compressor 182, the storage unit 182, the image estimating unit 186, the image selector 188, the touch screen 190, and the touch screen controller 195. The mobile communication module 120 enables the mobile device 100 to be connected to the external device through a mobile communication using at least one antenna (not shown), in response to the control of the controller 110. The mobile communication module 120 transmits and receives wireless signals for voice communication, video communication, short messaging service (SMS), and/or multimedia messaging service (MMS) to/from the mobile device 100, in which a telephone number has been input.

The sub-communication module 130 includes at least one of the wireless LAN module 131 and the near field communication module 132. For example, the sub-communication module 130 may include only one of the wireless LAN module 131 and the near field communication module 132, or both of the wireless LAN module 131 and the near field communication module 132.

The wireless LAN module 131 is connected to the INTERNET at a location where an AP (access point, not shown) is established, in response to the control of the controller 110. The wireless LAN module 131 supports the wireless LAN provision (IEEE802.11x) of the Institute of Electrical and Electronics Engineers (IEEE). The near field communication module 132 allows the mobile device 100 to wirelessly communicate with an image forming device (not shown), according to the control of the controller 110. Near field communication includes Bluetooth, Infrared Data Association (IrDA), and the like.

Depending on its capabilities, the mobile device 100 includes at least one of the mobile communication module 120, the wireless LAN module 131 and the near field communication module 132. For example, the mobile device 100 may include a combination of the mobile communication module 120, the wireless LAN module 131 and the near field communication module 132.

The multimedia module 140 includes the broadcasting communication module 141, the audio reproduction module 142 and/or the video reproduction module 143. The broadcasting communication module 141 receives broadcasting signals (for example, TV broadcasting signals, radio broadcasting signals, or data broadcasting signals) and additional broadcasting information (for example, EPS (Electric Program Guide) or ESG (Electric Service Guide)), which are transmitted from a broadcasting station, through a broadcasting and communication antenna (not shown), in response to the control of the controller 110. The audio reproduction module 142 can reproduce digital audio files (for example, files with a file extension of mp3, wma, ogg, or way), which are stored in the mobile device or received from an external device, according to the control of the controller 110. The video reproduction module 143 can reproduce video files (for example, files with a file extension of mpeg, mpg, mp4, avi, mov, or mkw) which are stored in the mobile device or received from an external device, in response to the control of the controller 110.

The multimedia module 140 may include the audio reproduction module 142 and the video reproduction module 143 except for the broadcasting communication module 141. Furthermore, the audio reproduction module 142 or the video reproduction module 143 of the multimedia module 140 may be associated with the controller 110.

The camera module 150 includes at least one of the first camera 151 and the second camera 152 for taking stationary pictures or moving pictures of a subject in response to the control of the controller 110. The camera module 150 may include one or both of the first camera 151 and the second camera 152. Further, the first camera 151 or the second camera 152 may include an auxiliary light source (for example, a flash (not shown)) for providing light necessary for taking a picture.

According to the embodiments of the present invention, the camera module 150 may take stationary pictures or moving pictures of a subject through a camera lens, which converts the stationary pictures or the moving pictures into digital data. The camera module 150 has a continuous-shooting function, which takes pictures continuously in a burst mode according to the control of the controller 110 so as to provide data of stationary pictures which are continuously taken.

The GPS module 155 receives electric waves from a plurality of GPS satellites (not shown) that orbit the Earth and calculates a position of the mobile device 100 using time of arrival from the GPS satellite (not shown) to the mobile device 100.

The input/output module 160 includes at least one of the plurality of buttons 161, the microphone 162, the speaker 163, the vibration motor 164, the connector 165 and the keypad 166. The microphone 162 receives and converts voice or sound into electric signals in response to the control of the controller 110.

The speaker 163 outputs sounds corresponding to various signals (for example, radio signals, broadcasting signals, digital audio files, digital video files, or photographing) of the mobile communication module 120, the sub-communication module 130, the multimedia module 140 or the camera module 150, toward the outside of the mobile device 100 in response to the control of the controller 110. The speaker 163 can output sounds (for example, button operation sound or ringtone relating to phone communication) corresponding to functions carried out in the mobile device 100.

The vibration motor 164 converts an electric signal into mechanical vibrations according to the control of the controller 110. For example, in a vibration mode, the vibration motor 164 operates when the mobile device 100 receives a voice communication call from another device (not shown).

The connector 165 is used as an interface connecting the mobile device 100 to an external device (not shown) or an electric power source (not shown). The mobile device 100 transmits data stored in the storage unit 182 to an external device (not shown) or receives data from the external device, through a wire cable connected to the connector 165 according to the control of the controller 110. The mobile device is also supplied with electric power from a power source through the wire cable connected to the connector 165 and enables a battery (not shown) to be charged.

The keypad 166 receives key inputs from a user in order to control the mobile device 100. The keypad 166 includes one of a physically mounted keypad on the mobile device 100 or a virtual keypad (not shown) displayed on the touch screen 190. The physical keypad (not shown) mounted on the mobile device 100 may be removed from the mobile device 100 according to the capability or structure of the mobile device 100.

The sensor module 172 includes at least one sensor for detecting a condition of the mobile device 100. For example, the sensor module 172 includes a proximity sensor (not shown) for detecting whether a user approaches the mobile device 100, an illumination sensor (not shown) for detecting an amount of light around the mobile device 100, and/or a motion sensor (not shown) for detecting a movement of the mobile device 100 (for example, rotation of the mobile device 100, and acceleration or vibration applied to the mobile device 100). At least one sensor detects the state of the mobile device 100 and generates signals corresponding to the detection before transmission of the signals to the controller 110. The sensor of the sensor module 172 may be added to or removed from the mobile device 100 according to the capability of the mobile device 100.

The electric power supply 174 supplies one or more batteries (not shown) with electric power in response to the control of the controller 110. The one or more batteries supply the mobile device 100 with electric power. Further, the electric power supplied by the electric power supply 174 to the mobile device 100 is inputted from an external power source (not shown) through a wire cable connected with the connector 165.

The storage unit 182 stores signals or data inputted/outputted in response to operations of the mobile communication module 120, the sub-communication module 130, the multimedia module 140, the camera module 150, the GPS module 155, the input/output module 160, the sensor module 174 and the touch screen 190, in accordance with the control of the controller 110. The storage unit 182 stores a control program for controlling the mobile device 100 or the controller 110. The term "storage" refers to the storage unit 182, a ROM 112 and a RAM 113 in the controller 110. Alternatively, the term "storage" may also refer to a memory card (not shown) attached to the mobile device 100 (for example, SD card, memory stick). The storage unit may include a non-volatile memory, a volatile memory, a hard disk drive (HDD), and/or a solid state drive (SSD). According to the embodiments of the present invention, the storage unit 182 stores moving pictures and/or stationary pictures taken by the camera module 150, especially a plurality of continuously taken pictures.

The image compressor 184 compresses stationary pictures or moving pictures taken by means of the camera module 150 using a predetermined image compression method, so as to store them in the storage unit 182. Specifically, the stationary continuously taken pictures are respectively compressed and stored in the storage unit 182.

The image estimating unit 186 detects a face region in each of the stationary pictures continuously taken. The image estimating unit 186 evaluates a quality of the face region using a blinking of eyes and a facial expression when the face region is detected. The image estimating unit 186 evaluates a clarity of the entire region of the picture by adding a weight to a region including the face region according to a predetermined criterion. The image estimating unit 186 evaluates a clarity of the entire region of the picture when the face region is not detected.

The image estimating unit 186 includes a face region detector 186a, a quality estimator 186b for estimating the quality of the face region, and a clarity estimator 186c. The face region detector 186a detects the face region from each of the continuously taken pictures.

The quality estimator 186b detects the presence or absence of the blinking of the eyes in the face region detected from each of plurality of continuously taken pictures and recognizes a facial expression, resulting in the evaluation of the quality of the face region. It is possible to detect the presence of the blinking of the eyes by determining whether eyes are open or closed. In the recognition of the facial expression, a facial pattern of a picture is compared with a predetermined facial pattern corresponding to a predetermined facial expression, so that it is possible to identify the facial expression as, for example, a smiling expression or a tearful expression. With regards to the quality of the face region, the quality estimator 186b gives the picture a high score when the eyes in the face region are open and an intermediate score when it is impossible to recognize whether the eyes in the face region are open or closed. Further, the quality estimator 186b gives the picture the high score when the smiling expression exists in the face region of the picture. Also, the quality estimator 186b gives the picture a low score when the tearful expression exists in the face region of the picture. Furthermore, the quality estimator 186b gives the picture the intermediate score when neither the smiling expression nor the tearful expression exists in the face region.

The quality estimator 186b calculates a quality score of the face region as a function of a first score based on the presence or absence of the blinking of the eyes and a second score based on the facial expression, so as to evaluate the quality of the face region. As the first and second scores increase, the evaluation of the quality of the face region improves.

The clarity estimator 186c evaluates the clarity of the entire region of the picture as a function of a predetermined weight applied to each region including the face region when the face region is detected in each of the plurality of continuously taken pictures. For example, the clarity estimator 186c divides the entire region into the face region, a body region and a background region in each of the plurality of continuously taken pictures, and evaluates the clarity of each region. Then, the clarity estimator 186c calculates a weight average by multiplying the clarity of each region by the predetermined weight of each region. The clarity estimator 186c evaluates the clarity by calculating a clarity score of the entire region in each of the pictures based on the weight average applied to the calculated clarity of each region. Alternatively, if the face region is not detected, the clarity estimator 186c measures the clarity of the picture after the clarity of the entire region of each picture is calculated and calculates a score of the clarity with respect to the entire region of the picture using the measured clarity, thereby estimating the clarity.

The image recommending unit 188 selects one of the continuously taken pictures that has a high score by using the scores of the face region quality evaluation and the clarity evaluation which the quality estimator 186b and the clarity estimator 186c have calculated. For example, the image recommending unit 188 selects a first candidate picture, which has a higher score than a predetermined criterion (for example, a level of 70% of the highest score of the clarity) with regards to the clarity, from the plurality of continuously taken pictures. Then, the image recommending unit 188 determines the presence or absence of the quality evaluation score for the face region. When the quality evaluation score for the face region exists, the image recommending unit 188 selects second candidate pictures, which have the highest quality evaluation scores for the face region, from the first candidate pictures. Next, the image recommending unit 188 compares the clarity scores of the second candidate pictures and selects a picture which has the highest clarity score, as a recommended picture.

The touch screen 190 is a display unit providing a user with a user interface corresponding to various services (for example, continuous-shooting). The touch screen transmits an analog signal, which corresponds to at least one touch inputted to the user interface, to the touch screen controller 195. The touch screen 190 receives the at least one touch inputted by a part of a user's body (for example, fingers, including a thumb) or an object (for example, a stylus pen). Further, the touch screen 190 receives continuous movements of at least one touch. The touch screen 190 transmits analog signals corresponding to the continuous movement of the inputted touch to the touch screen controller 195. According to the embodiments of the present invention, the touch screen 190 receives input signals corresponding to the continuous-shooting by the user and transmits them to the touch screen controller 195.

The touch screen controller 195 converts the analog signals received from the touch screen 190 into digital signals (for example, X coordinate, Y coordinate) and transmits the digital signals to the controller 110. The controller 110 controls the touch screen 190 using the digital signal received from the touch screen controller 195. For example, the controller 110 allows a shortcut icon (not shown), which is displayed on the touch screen 190, to be selected or carried out in response to the touch. Further, the touch screen controller 195 be associated with the controller 110.

According to the embodiment of the present invention, the controller 110 controls the touch screen controller 195 so that the plurality of continuously taken pictures taken by the camera module 150 are displayed, and so that a picture recommended by the image recommending unit 188 is displayed on the touch screen 190.

Hereinafter, an operation of continuously taking pictures using the mobile device 100 according to the embodiment of the present invention will be described in detail.

Figure 2:
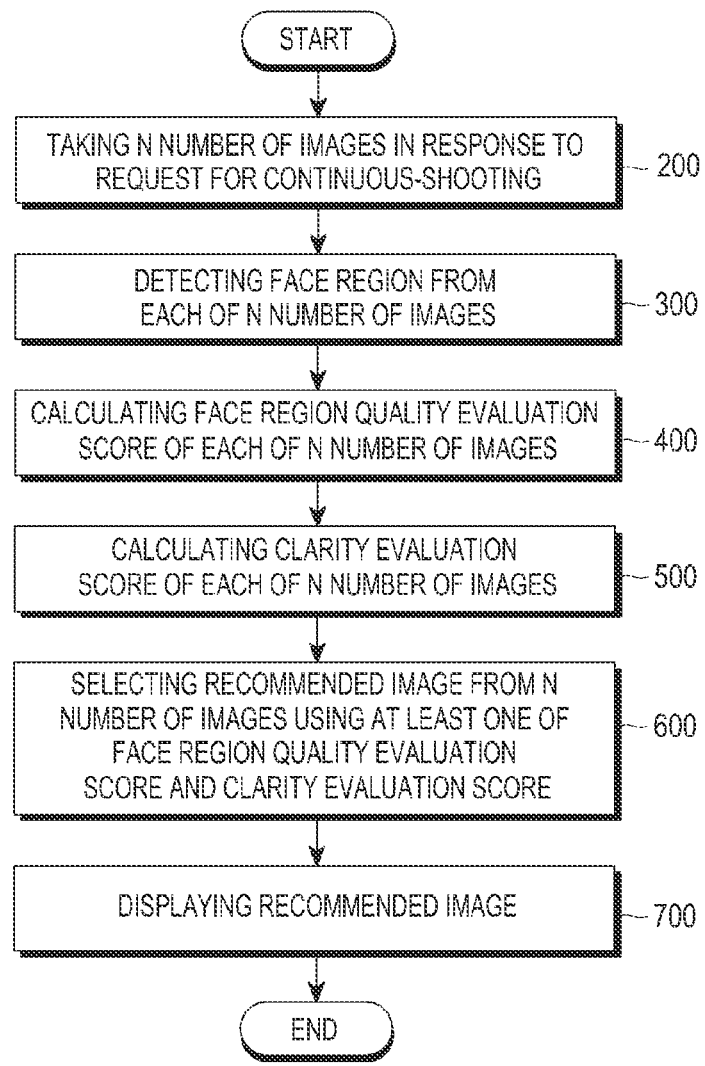
FIG. 2 is a flowchart illustrating an operation of continuously taking pictures according to the embodiment of the present invention.

FIG. 2 is a flowchart illustrating an operation of taking pictures continuously according to the embodiment of the present invention.

Referring to FIG. 2, the mobile device 100 takes pictures continuously using the camera module 150 in response to the user's request to take the pictures continuously, so as to take the plurality of pictures (hereinafter, assuming a number 'n' of pictures).

Figure 3A:
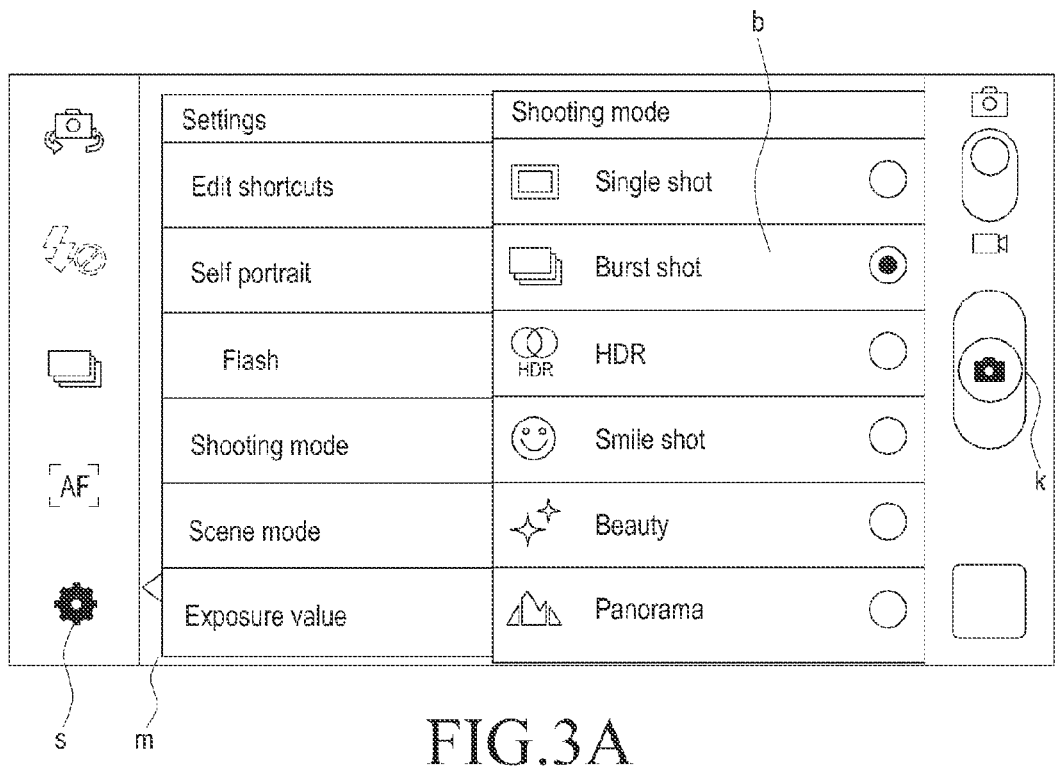
FIGS. 3A and 3B are views showing an example of a touch screen in a photographing mode of a camera in the mobile device according to the embodiment of the present invention.
Figure 3B:
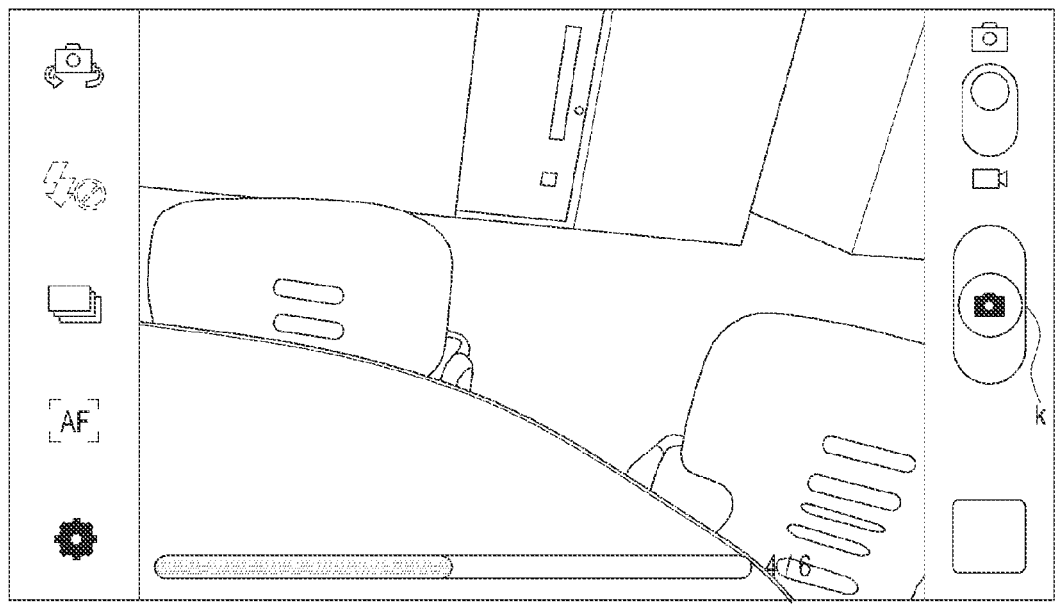

FIGS. 3A and 3B are examples of views showing the touch screen 190 in a photographing mode of the camera in the mobile device 100 according to the embodiment of the present invention.

Referring to FIG. 3A, the mobile device 100 displays a photographing mode setting menu (m) as the user touches a setting icon(s) in the photographing mode. The mobile device 100 includes "Burst shot" mode for a continuous-shooting on the photographing mode setting menu (m). When the user selects the "Burst shot" mode, the photographing mode of the mobile device 100 is set in a continuous-shooting mode.

Referring to FIG. 3B, the mobile device 100 receives a request for continuous-shooting as the user touches or presses a shutter key (k) in the continuous-shooting mode, so as to take a predetermined number of pictures (e.g., 6 pictures) continuously. In FIG. 3B, photographing a fourth picture in continuous-shooting of six times is displayed.

The mobile device 100 detects the face region in each of the n number of pictures at step 300 after photographing the n pictures in the continuous-shooting as described above. The mobile device 100 extracts edge information from each of the n pictures using the face recognition method with regards to the n pictures, which in turn detects characteristic elements, including, for example, eyes, a nose and a mouth, from the image region in the extracted edge information. Then, the mobile device 100 detects the face region depending on the detected characteristic elements. Where a subject of the picture includes more than one person, a plurality of face regions may be detected in one picture. With regards to a technique for extracting the face region using the face recognition method, the conventional technique may be used.

The mobile device 100 determines the face region quality for each of the n images, at step 400. For example, the face region quality is determined by calculating the face region evaluation score.

Figure 4:
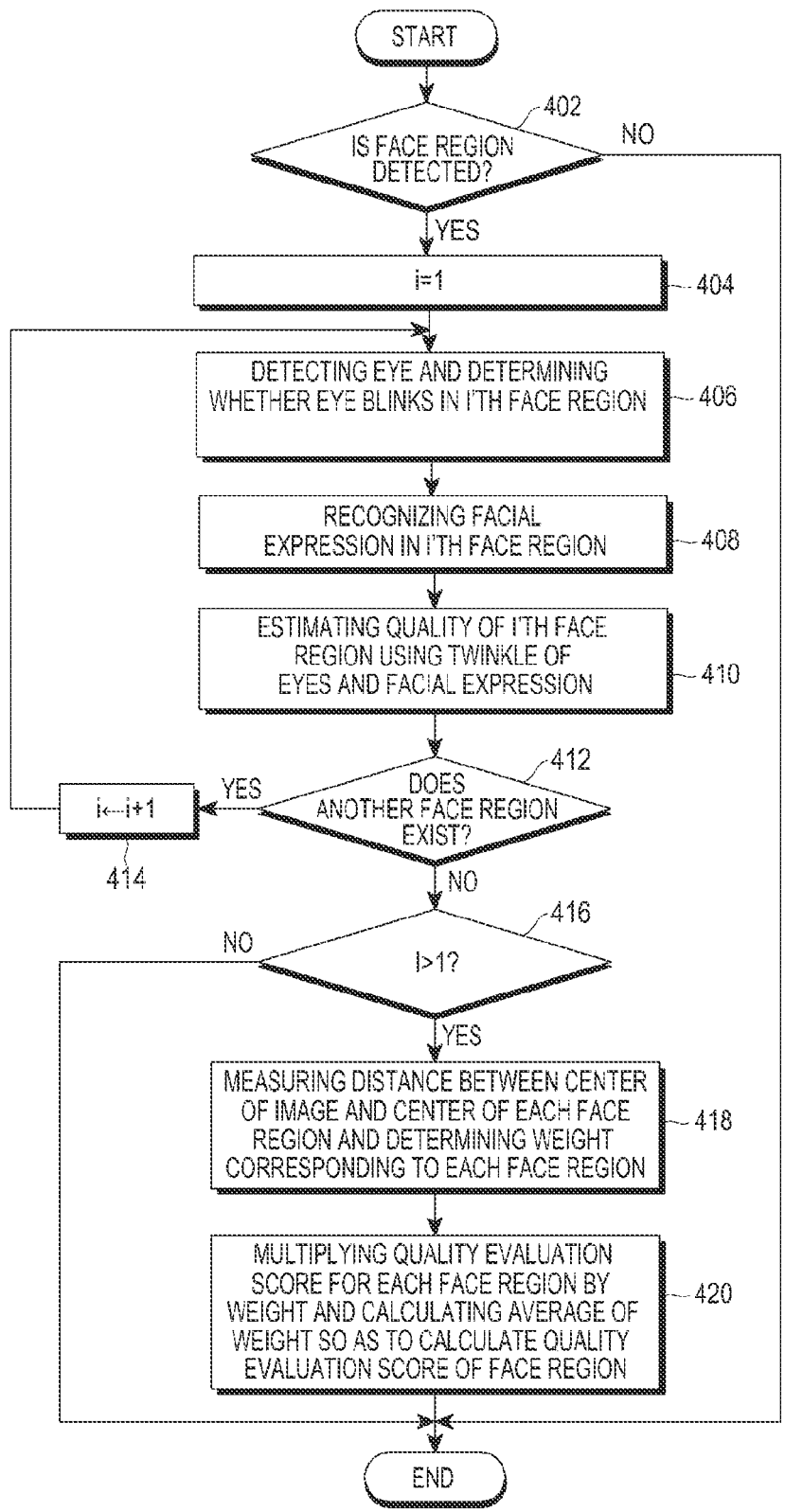
FIG. 4 is a flowchart illustrating an operation of calculating an evaluation value relating to a face region in an image according to the embodiment of the present invention.

A process for calculating the face region quality evaluation score at step 400 will be described. FIG. 4 is a flowchart illustrating an operation of calculating the face region quality evaluation score of the image. In FIG. 4, a process of calculating the face region quality evaluation score of a certain image from the n images is shown, and the face region quality evaluation score for each of the n images is calculated.

Referring to FIG. 4, the mobile device 100 determines whether the face region is detected in a corresponding image. If the face region is not detected, the mobile device 100 proceeds to step 500 (FIG. 2).

If the face region is detected, the mobile device 100 sets i, which indicates the number of the face regions detected in step 400, to 1 (i=1) in step 404, and proceeds to step 406.

The mobile device 100 detects eyes in an $i^{th}$ face region in step 406, and determines the presence or absence of the blinking of the eyes. Here, the mobile device 100 performs the detecting of the eyes in the detected face region. An eyes detecting method includes various methods. For example, the mobile device 100 detects the eyes by detecting a region having a circular shape in the face region, located at an upper portion of the face region and having predetermined characteristics associated with eyes. Further, the mobile device 100 determines the presence or absence of the blinking of the eyes by using the predetermined characteristics when the eyes are open and the predetermined characteristics when the eyes are closed, based on the detected eyes, in order to identify that the eyes are open or closed.

The mobile device 100 recognizes an $i^{th}$ face region in step 408. For example, the mobile device recognizes if a facial expression in the face region is a smiling expression or a tearful expression, using the predetermined characteristics of the facial expressions.

As described above, after the mobile device 100 performs the detection of eyes, the determination of the existence of the blinking of the eyes, and the recognition of the facial expression, it calculates the $i^{th}$ face region quality evaluation score using the result of the determination of the blinking of the eyes and the result of the recognition of the facial expression. At this time, the mobile device 100 gives a higher score when the eyes are open and a lower score when the eyes are closed. Further, the mobile device 100 gives an intermediate score when it is difficult to determine whether the eyes are open or closed. Furthermore, the face region quality evaluation unit 186b gives a higher score when the facial expression is smiling and a lower score when the facial expression is tearful. However, the face region quality evaluation unit 186b gives an intermediate score when the facial expression is neither smiling nor tearful. Then, the mobile device 100 calculates the face region quality evaluation score using the first score based on the existence of the blinking of the eyes and the second score based on the recognition of the facial expression, so as to evaluate the quality of the face region. As the first and second scores increase, the quality of the face region improves.

After evaluating the quality of the $i^{th}$ face region, the mobile device 100 determines whether another face region exists in step 412. If another face region exists, the mobile device 100 repeats steps 406 to 414 until no other face regions remain (i.e., after increasing the i value to as much as 1 (i<-i+1)). Accordingly, when the plurality of face regions exist in the image, the mobile device 100 performs the quality evaluation for each face region.

The mobile device 100 carries out the step 416 so as to determine whether the number of the face regions is more than 1 (i>1), when another face region exists. If the number of the face regions is not more than 1 (i.e., i=1), the mobile device 100 uses the face region quality evaluation score obtained at the step 410.

Alternatively, if a plurality of the face regions exists, the mobile device 100 measures a distance between a center of the image and a respective center of each of the face regions in step 418. Then, the mobile device 100 determines a weight corresponding to each face region according to the distance to the center of each face region. In step 420, the mobile device 100 multiplies the quality evaluation score of each face region by the weight corresponding to each face region quality evaluation score, so as to calculate the face region quality evaluation score with respect to the corresponding image after adding the face region quality evaluation scores multiplied by the weight and calculating the weight average. A method of calculating a face region quality evaluation score of a corresponding image when the image has a plurality of the face regions, will be described in more detail below.

Figure 5:
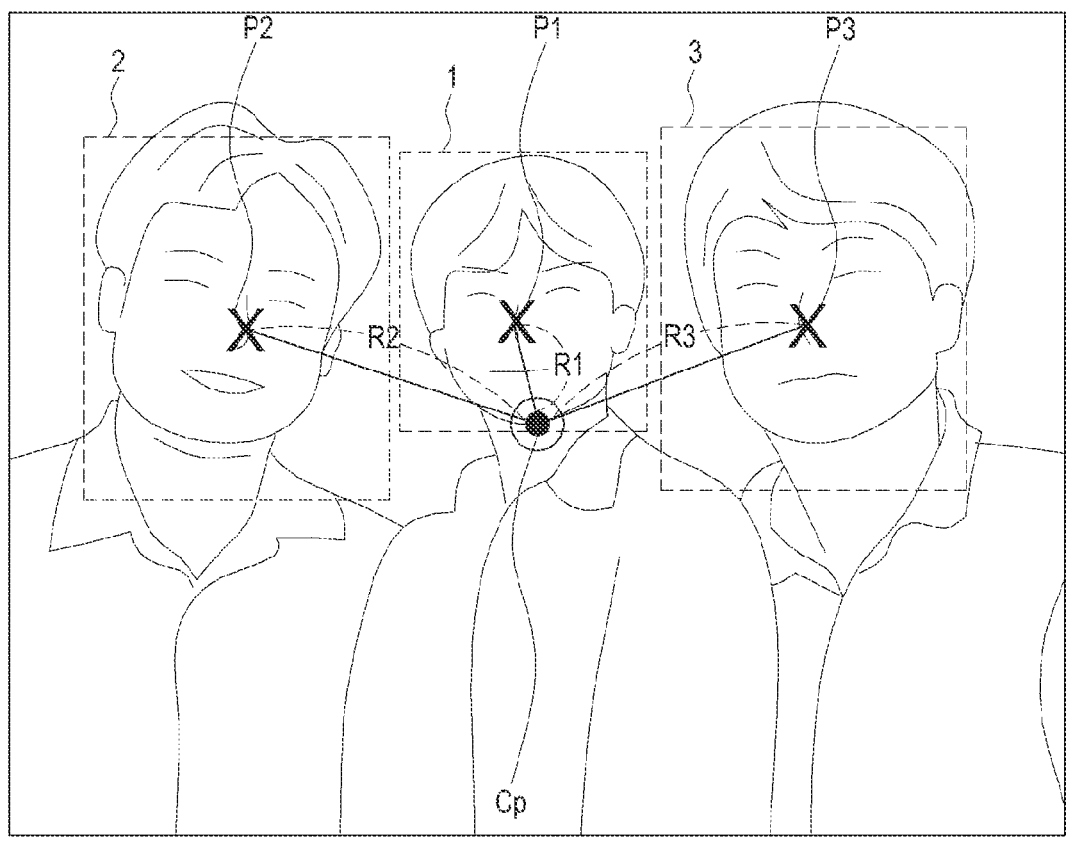
FIG. 5 is an example of a view showing a display on which a plurality of face regions in an image is displayed, according to the embodiment of the present invention.

FIG. 5 is a view showing an example of an image having a plurality of face regions according to the embodiment of the present invention. In FIG. 5, the image includes three face regions, for example, a first face region 1, a second face region 2, and a third face region 3.

The mobile device 100 measures distances R1, R2 and R3 from the center Cp of the image to each center P1, P2 and P3 of the first, second and third face regions 1, 2 and 3, respectively. The mobile device 100 determines a respective weight corresponding to each of the first, second and third face regions 1, 2 and 3, depending on the values of R1, R2 and R3. It is preferred to give a higher weight to a face region having a shorter distance (i.e., is closer to the center Cp of the image). The mobile device 100 multiplies the calculated quality evaluation score with respect to the first, second and third face regions 1, 2 and 3 by the corresponding weight, and calculates a weight average so as to calculate a face region quality evaluation score for the corresponding image. Therefore, in the case of the plurality of face regions in the image, as the face region quality evaluation score of the face region near the center of the image increases, the face region quality evaluation score of the entire region of the image also increases.

Referring to FIG. 2 again, after calculating the face region quality, for example, the face region quality evaluation score of each of the n images in a manner as described above, the mobile device 100 determines the clarity of each of the n images in step 500.

Figure 6:
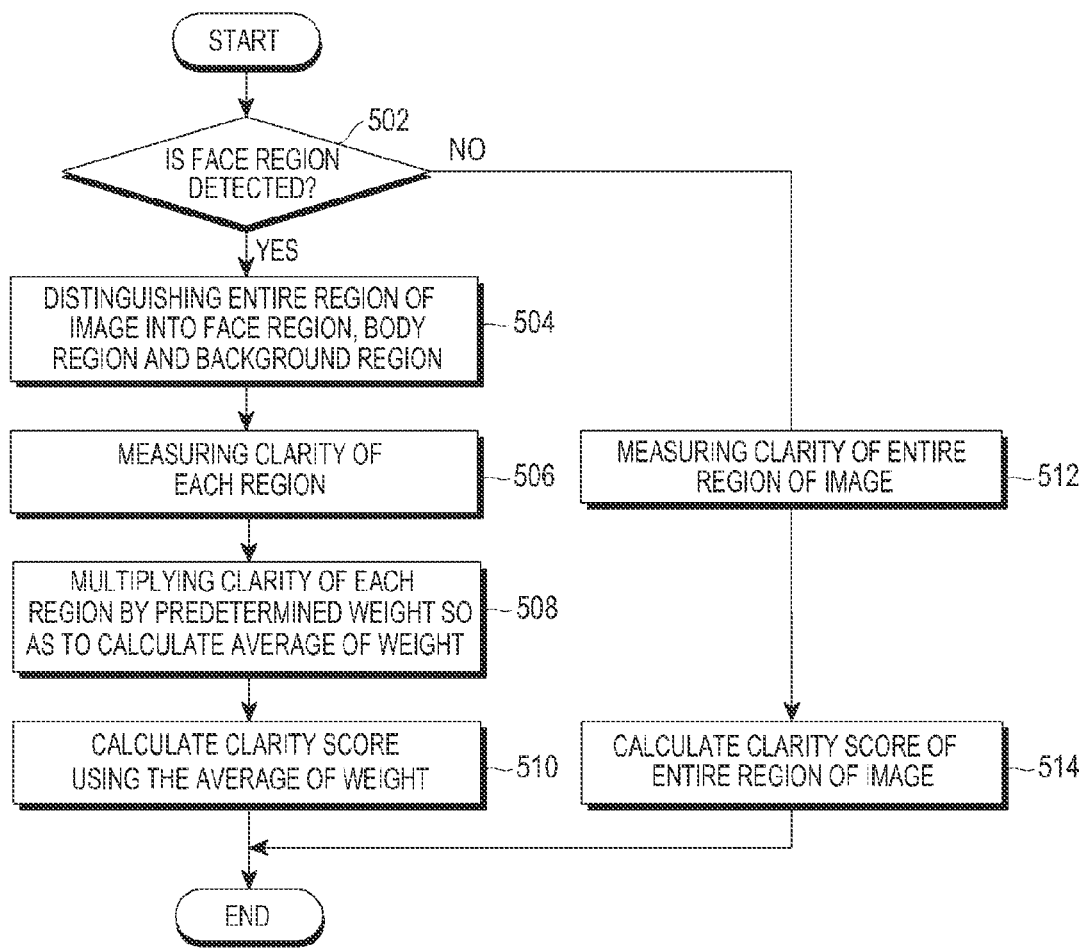
FIG. 6 is a flowchart illustrating an operation of calculating an evaluation value relating to a clarity of an image according to the embodiment of the present invention.

A process of calculating a clarity evaluation score in step 500 will now be described in detail. FIG. 6 is a flowchart illustrating an operation of calculating a clarity evaluation score of an image according to the embodiment of the present invention. In FIG. 6, a process of calculating the clarity evaluation score of any one of the n images is illustrated, in which the clarity evaluation score of each of the n images is calculated.

Referring to FIG. 6, the mobile device 100 determines whether the face region is detected in the image in step 502. If the face region is not detected, the mobile device 100 measures the clarity of the entire region of the image in step 512 and calculates the clarity score of the entire region of the image in step 514. At this time, the mobile device 100 measures the clarity of the image based on a contrast, saturation, color and the like, and calculates the clarity score as a function of a predetermined clarity score criterion. As the clarity increases, the clarity score also increases.

Alternatively, when the face region is detected, the mobile device 100 separates the entire region of the image into the face region, the body region and the background region using characteristics of a predetermined body region and the background region in step 504.

Figure 7:
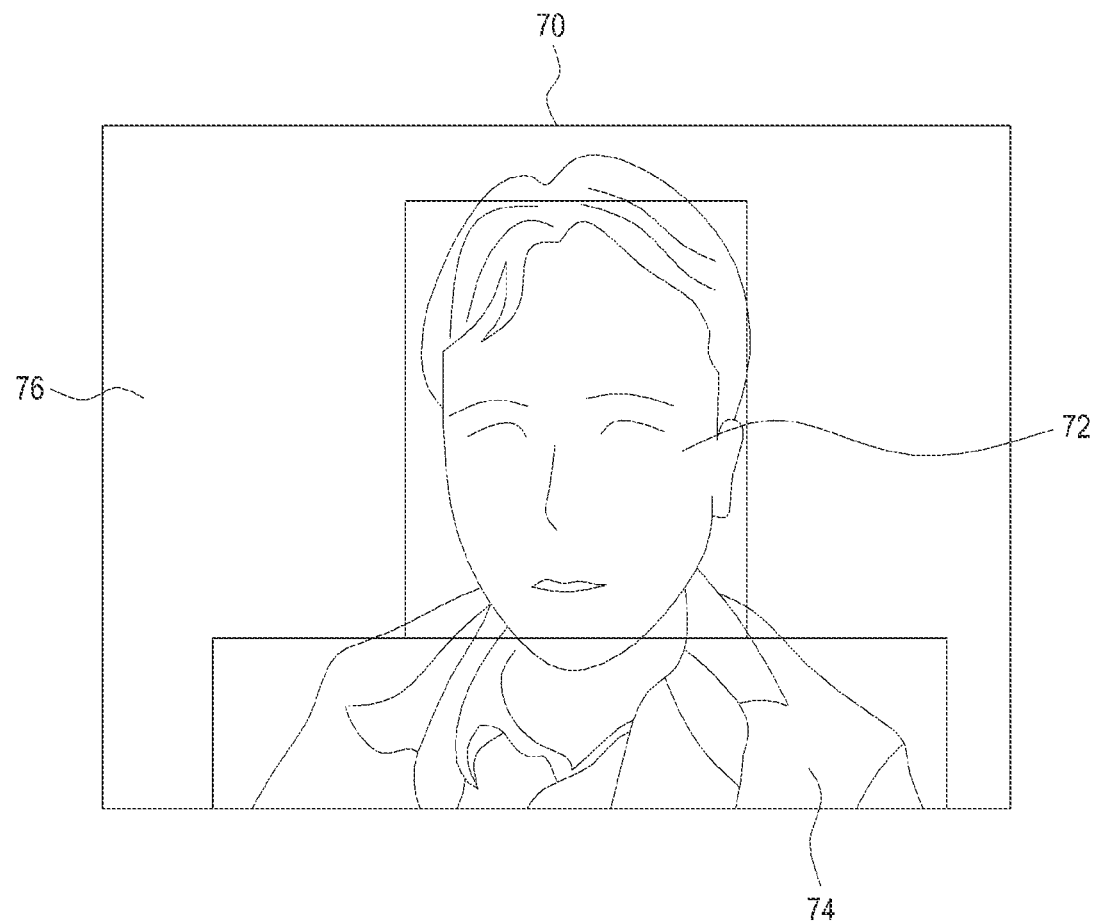
FIG. 7 is an example of a view showing a display on which an image is divided into a face region, a body region and a background region, according to the embodiment of the present invention.

FIG. 7 is a view showing the face region, the body region and the background region which are separated according to the embodiment of the present invention. Referring to FIG. 7, when the face region is detected from the image, the mobile device distinguishes the body region 74, which corresponds to the characteristic of the body, from the face region 72, detected from the entire region 70 of the image, and identifies a remaining region, excluding the face region 72 and the body region 74, as the background region 76, as shown in FIG. 7.

In step 506, the mobile device 100 measures the clarity of each of the face region 72, the body region 74 and the background region 76.

Next, the mobile device 100 multiplies the clarity of each of the face region 72, the body region 74 and the background region 76 by a predetermined face region weight, a predetermined body region weight, and a predetermined background region weight, respectively, so as to obtain the weighted average, in step 508. The mobile device 100 calculates the clarity score of the entire image using the weighted average value in step 510. At this time, a respective weight is higher in the face region than the body region and is higher in the body region than the background region. When the clarity of the face region increases, the clarity score of the entire image is greater. In other words, the mobile device 100 determines the clarity of each of the face region, the body region and the background region before it determines the clarity of the corresponding image based on the clarity of each region.

Referring to FIG. 2 again, the mobile device 100 calculates the clarity evaluation score of the n images in such a manner as described above, and then selects a recommended image from the n images using at least one of the face region quality evaluation score and the clarity evaluation score, in step 600.

Figure 8:
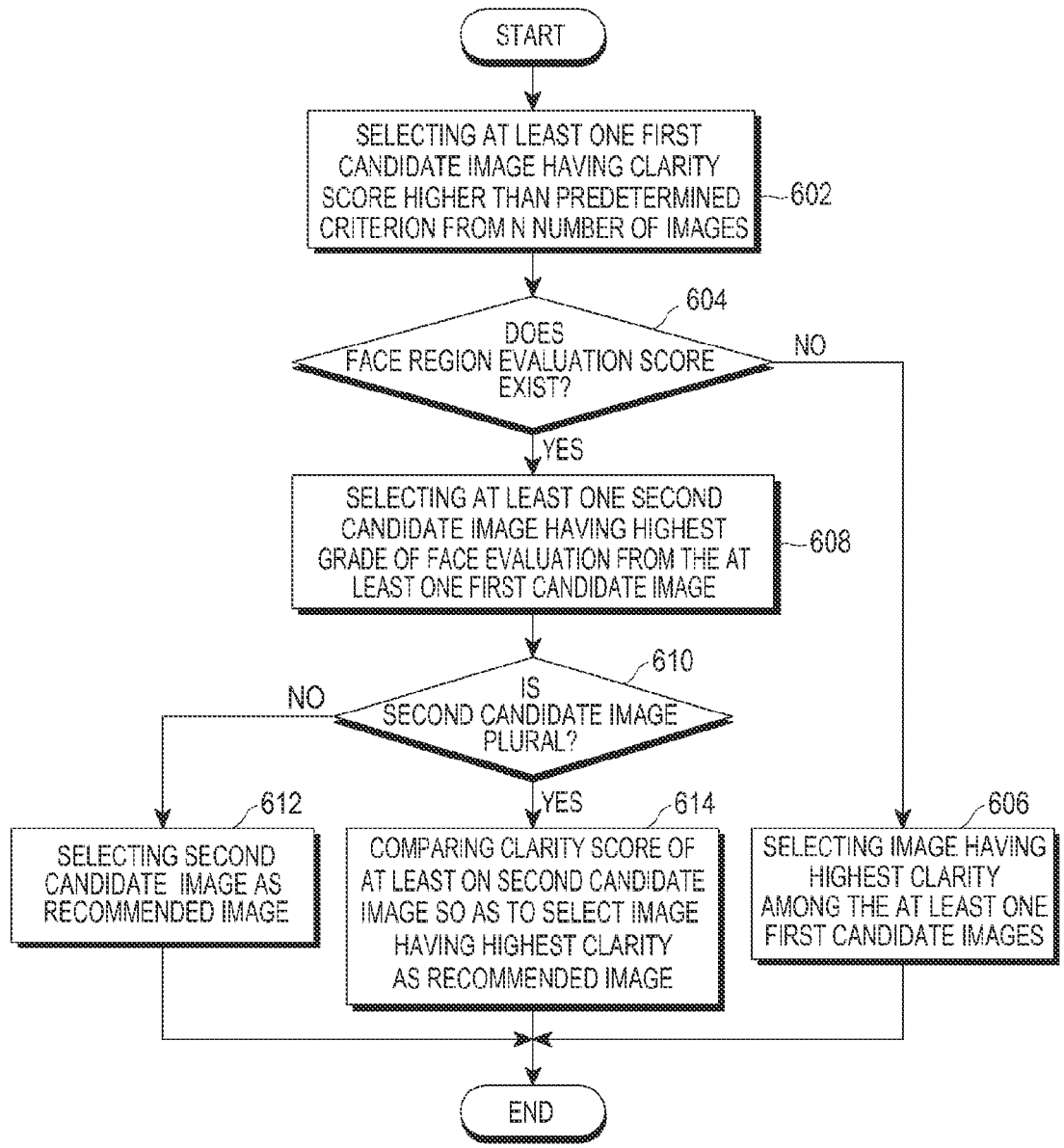
FIGS. 8 and 9 respectively are a flowchart and a view illustrating an operation of selecting a recommended image according to the embodiment of the present invention.
Figure 9:
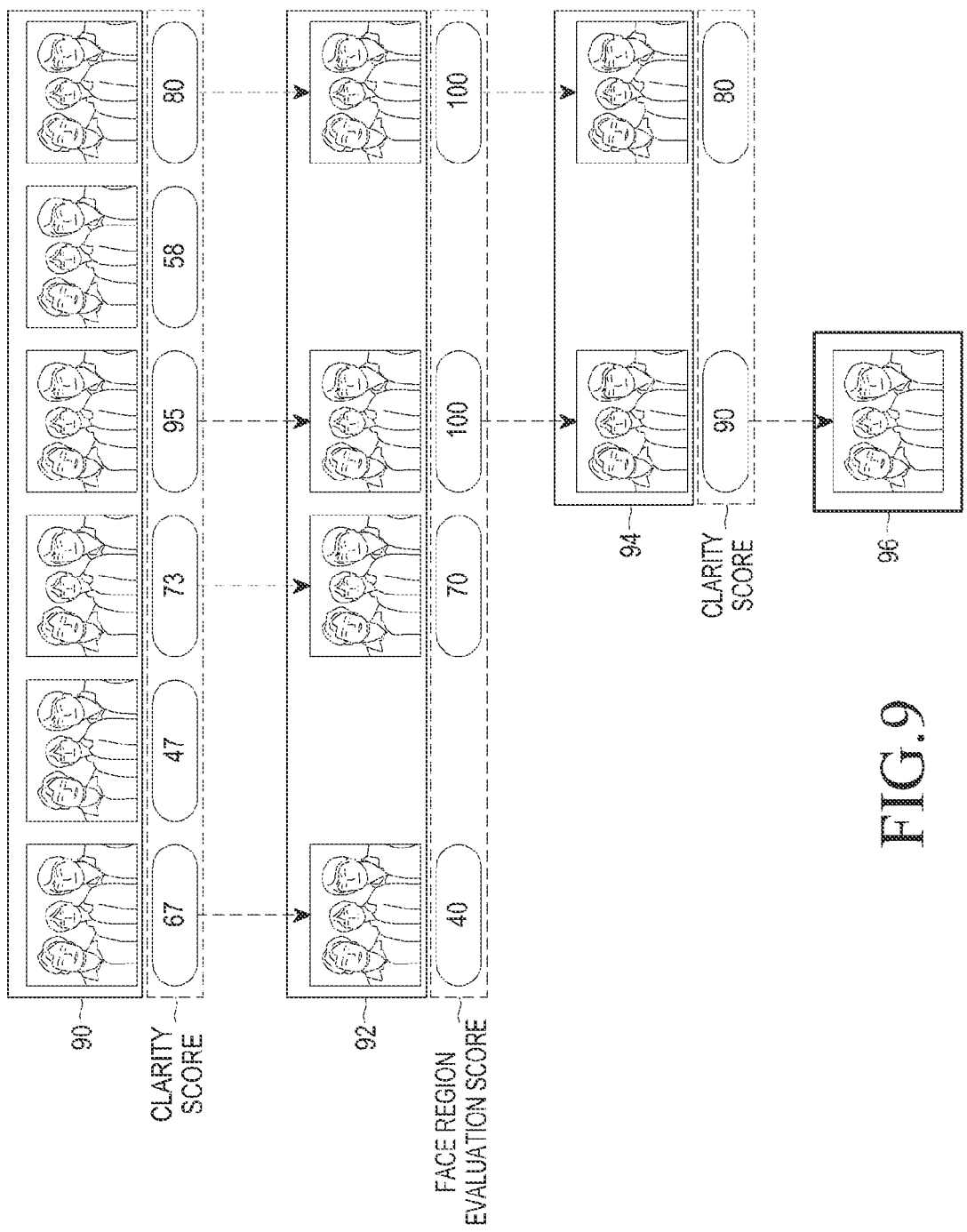

A processing of selecting the recommended image at step 600 will now be described. FIGS. 8 and 9 are views illustrating an operation of selecting the recommended image according to the embodiment of the present invention. FIG. 8 is a flowchart illustrating the process of selecting one recommended image from the n images, and FIG. 9 shows an example of the operation of selecting any one recommended image among, for example, six images taken.

Referring to FIGS. 8 and 9, in step 602, the mobile device 100 selects at least one first candidate image, which has a higher clarity score than the predetermined criterion, from the n images. The predetermined criterion may be set to, for example, about 70% of the highest clarity score. For example, when six images are continuously taken as shown in FIG. 9, the mobile device 100 selects the first candidate images 92, which have the clarity score higher than, for example, 66.5 points (about 70% of 95 points, which is the highest clarity score in the six images 90).

After selecting the first candidate images 92, the mobile device 100 proceeds to step 604 and determines whether the face region evaluation score corresponding to the first candidate images 92 exists. If the face region evaluation score exists, the mobile device 100 selects, in step 608, at least one second candidate image 94, which has the highest face region evaluation score, among the at least one first candidate image 92.

The mobile device 100 determines whether there are more than one second candidate images 94 in step 610. If there is only one second candidate image 94, the mobile device 100 proceeds to step 612 so as to select the second candidate image as a recommended image. However, if there are more than one second candidate images 94, the mobile device 100 compares the clarity scores of the plurality of second candidate images 94 and selects an image, which has the highest clarity, as a recommended image 96, in step 614. For example, the mobile device 100 selects an image, which has a relatively higher clarity score of, for example, 95 points, among the plurality of second candidate images 94 respectively having the clarity scores of 95 points and 80 points, as a recommended image 96, as shown in FIG. 9.

Alternatively, if the image has no face region evaluation score because the face region is not detected, the mobile device 100 proceeds to step 606 and selects an image, which has the highest clarity, among the at least one first candidate image 90, as a recommended image.

In step 700 (FIG. 2), the mobile device 100 displays the recommended image on the touch screen 190 after selecting the recommended image in such a manner as described above.

Figure 10:
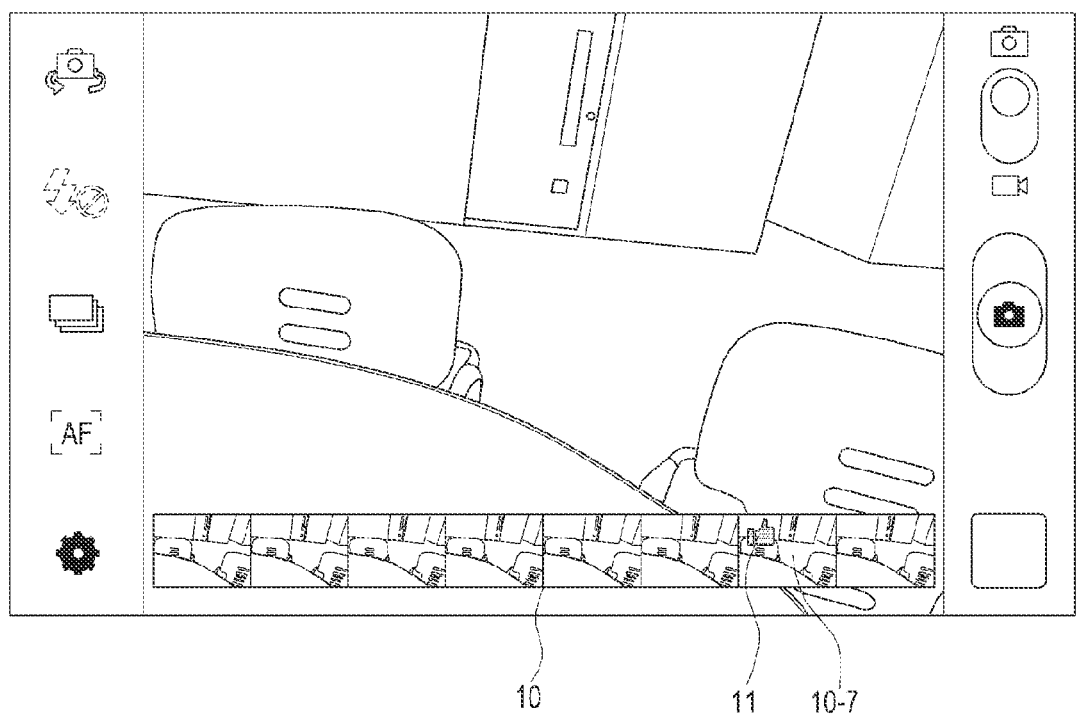
FIG. 10 is an example of a view showing a display on which a recommended image is displayed according to the embodiment of the present invention.

FIG. 10 is an example of a view showing a recommended image display screen according to the embodiment of the present invention. Referring to FIG. 10, the mobile device 100 displays a plurality of images 10, which are continuously taken, on a touch screen 190, and displays a recommended image mark 11 indicating the recommended image on the selected and recommended image 10-7 among the continuously taken images. Accordingly, it is easy for a user to recognize that the image 10-7, on which the recommended image mark 11 is displayed, among the continuously taken images 10 has a high quality and is an excellent image.

According to the embodiments of the present invention as described above, the plurality of images obtained by the continuous-shooting are evaluated by using various evaluation elements such as the clarity and the blinking of the eyes, as well as the face detection method and the smiling detection method, thereby recommending the picture with high quality to the user. Further, according to the embodiment of the present invention, the plurality of images taken by the continuous-shooting are evaluated by using any one of the face region evaluation score or the clarity evaluation score. Therefore, it is possible to evaluate the pictures even if the subject is not a person and to recommend the picture with a high quality to the user.

In the embodiments of the present invention, the mobile device has been described as an example, but the present invention may be applied to any device having a camera function and a continuous-shooting function. Further, even if it has been described that the embodiment of the present invention recommends one image among the plural images, it is possible to recommend more than one of the plurality of images, and to recommend the images in order of the quality (greatest to least or vice versa) when at least one of the images is recommended. While the present invention has been shown and described with reference to certain embodiments thereof, it will be understood by those skilled in the art that various changes in form and details may be made therein without departing from the spirit and scope of the present invention as defined by the appended claims.

In summary, the foregoing description provides embodiments of the present invention and is not used for limiting the protection scope thereof. Any modification, equivalent substitution, or improvement made without departing from the spirit and principle of the present invention should be covered by the protection scope of the following claims of the present invention.

What is claimed is:
1. An electronic device, comprising:
an image capturing unit configured to obtain a plurality of images;
a display configured to display one or more of the plurality of images; and
a processor configured to:
select at least one image from among the plurality of images, based on a facial expression of one or more objects recognized on the at least one image from among the plurality of images and a clarity of the at least one image from among the plurality of images, wherein the clarity is determined by multiplying a clarity of each portion of the at least one image by a predetermined weight of the each portion; and control the display to display the at least one selected image.

2. The device of claim 1, wherein the one or more objects further comprise a human face, and wherein an image quality comprises one or more of a red eye, closed eye, or eye line.

3. The device of claim 1, wherein the image capturing unit is further configured to automatically obtain the plurality of images upon receiving a single user input.

4. The device of claim 1, wherein the processor is further configured to display the plurality of images on the display, and
to display the at least one selected image from among the plurality of images in a manner different from a manner used for displaying a remainder of the plurality of images.

5. The device of claim 1, wherein the processor is further configured to select the at least one image by:
selecting one or more first candidate images from the plurality of images, based at least partly on the clarity of the one or more first candidate images;
selecting one or more second candidate images from the one or more first candidate images, wherein the one or more second candidate images contain one or more human faces; and
selecting at least one of the one or more second candidate images, based at least partly on an image quality of the one or more human faces.

6. The device of claim 1, wherein the processor is further configured to select the at least one image by:
selecting one or more first candidate images from the plurality of images, based at least partly on the clarity of the one or more first candidate images;
determining whether each of the one or more first candidate images contains one or more human faces; and
selecting at least one of the one or more first candidate images, as a function of the clarity of the one or more first candidate images if none of the one or more first candidate images contains the one or mores human faces.

7. The device of claim 1, wherein the processor is further configured to determine positions of the one or more objects in one of the plurality of images, and
to determine image qualities of the one or more objects differently, based at least partly on the positions of the one or more objects.

8. The device of claim 1, wherein the processor is further configured to determine a clarity of an entirety of the at least one image from among the plurality of images.

9. The device of claim 1, wherein the processor is further configured to recognize two or more portions of a human object contained in the at least one image from among the plurality of images, and to determine a clarity of the two or more portions.

10. The device of claim 1, wherein the processor is further configured to select the at least one image by:
selecting one or more candidate images from the plurality of images, wherein the one or more candidate images have a clarity value greater than or equal to a predetermined value; and
selecting the at least one image from the one or more candidates images, based on an image quality of an object recognized in the one or more candidate images.

11. A method of operating an electronic device, the method comprising:
obtaining a plurality of images; and
selecting at least one image from among the plurality of images, based on a facial expression of one or more objects recognized on the at least one image from among the plurality of images and a clarity of the at least one image from among the plurality of images, wherein the clarity is determined by multiplying a clarity of each portion of the at least one image by a predetermined weight of the each portion.

12. The method of claim 11, wherein the one or more objects include a human face, and wherein an image quality includes one or more of a red eye, closed eye, facial expression, facial pose, or eye line.

13. The method of claim 11, wherein the plurality of images is automatically obtained upon receiving a single user input.

14. The method of claim 11, further comprising:
displaying the plurality of images on the display, and
displaying the at least one selected image from among the plurality of images in a manner different from a manner used for displaying a remainder of the plurality of images.

15. The method of claim 11, wherein selecting the at least one image comprises:
selecting one or more first candidate images from the plurality of images, based at least partly on a clarity of the one or more first candidate images;
selecting one or more second candidate images from the one or more first candidate images, wherein the one or more second candidate images contain one or more human faces; and
selecting at least one of the one or more second candidate images, based at least partly on an image quality of the one or more human faces.

16. The method of claim 11, wherein selecting the at least one image comprises:
selecting one or more first candidate images from the plurality of images, based at least partly on a clarity of the one or more first candidate images;
determining whether each of the one or more first candidate images contains one or more human faces; and
selecting the at least one of the one or more first candidate images, as a function of the clarity of the image if none of the one or more first candidate images contains a human face.

17. The method of claim 11, further comprising:
determining positions of the one or more objects in one of the plurality of images; and
determining image qualities of the one or more objects differently, based at least partly on the positions of the one or more objects.

18. The method of claim 11, further comprising:
determining a clarity of an entirety of the at least one image from among the plurality of images.

19. The method of claim 11, further comprising:
recognizing two or more portions of a human object contained in the one or more of the plurality of images; and
determining clarity of the two or more portions.

20. The method of claim 11, wherein selecting the at least one image comprises:
selecting one or more candidate images from the plurality of images, wherein the one or more candidate images have a clarity value greater than or equal to a predetermined value; and
selecting the at least one image from the one or more candidates images, based on an image quality of an object recognized in the one or more candidate images.

21. An apparatus comprising:
a camera unit configured to obtain a plurality of images; and
a processor configured to
select at least one image from among the plurality of images, based at least partly on at least one of:
  an image quality of one or more human faces recognized on the at least one image from among the plurality of images, and
  a clarity of the at least one image from among the plurality of images, wherein the clarity is determined by multiplying a clarity of each portion of the at least one image by a predetermined weight of the each portion.

* * * * *